United States Patent [19]

Bertin et al.

[11] Patent Number: 5,135,090
[45] Date of Patent: Aug. 4, 1992

[54] ACTUATOR FOR A MOTOR VEHICLE CLUTCH

[75] Inventors: Patrice Bertin, Mery/Oise; Frank Chazot, Margency; Christian Pankowiak, Saint-Ouen, all of France

[73] Assignee: VALEO, Paris, France

[21] Appl. No.: 722,515

[22] Filed: Jun. 27, 1991

[30] Foreign Application Priority Data

Jun. 29, 1990 [FR] France ............................ 90 08217

[51] Int. Cl.[5] .............................................. F16D 13/44
[52] U.S. Cl. ..................... 192/82 P; 192/90; 192/995
[58] Field of Search ............... 192/82 P, 84 R, 90, 192/995

[56] References Cited

U.S. PATENT DOCUMENTS

| | | | |
|---|---|---|---|
| 4,650,056 | 3/1987 | Sevennec et al. | 192/90 |
| 4,651,855 | 3/1987 | Grunberg | 192/90 X |
| 4,671,400 | 6/1987 | Grunberg et al. | 192/995 X |
| 4,744,450 | 5/1988 | Bertin et al. | 192/82 P X |
| 4,828,093 | 5/1989 | Bertin et al. | 192/90 |
| 4,829,221 | 5/1989 | Grunberg et al. | 192/90 X |

FOREIGN PATENT DOCUMENTS

| | | |
|---|---|---|
| 0220092 | 4/1987 | European Pat. Off. |
| 1750632 | 2/1971 | Fed. Rep. of Germany |
| 2564220 | 11/1985 | France |
| 2564920 | 11/1985 | France |
| 2610259 | 8/1988 | France |
| 2610261 | 8/1988 | France |
| 2610266 | 8/1988 | France ............ 192/84 R |
| 558898 | 1/1944 | United Kingdom |
| 2159596 | 12/1985 | United Kingdom ........... 192/90 |

OTHER PUBLICATIONS

Scott, David, Popular Science, "Footloose", Mar. 1988 pp. 64 and 65.
Filderman; R. and Grunberg, P.; "Electronic Actuator Eliminates Clutch Pedal"; Automotive Engineering; Oct. 1984; pp. 81-85.

Primary Examiner—Leslie A. Braun
Assistant Examiner—Nicholas Whitelaw
Attorney, Agent, or Firm—Longacre & White

[57] ABSTRACT

An actuator, especially for a motor vehicle clutch, is of the kind that has a casing carrying a reversible electric motor which has a drive spindle, a driving element for coupling the actuator to an actuating member of the clutch, a coupling mechanism which couples the motor drive spindle to the driving element and which includes a toothed sector plate coupled in rotation to the driving element. The coupling mechanism also includes an actuating force reducing mechanism having a compensating spring. The actuating force reducing mechansim includes a compensating lever which is articulated on the toothed sector plate and on an intermediate pivoting lever, which is itself articulated to the casing, the intermediate pivoting lever being coupled to the compensating spring.

10 Claims, 6 Drawing Sheets

(PRIOR ART)

FIG.9

ACTUATOR FOR A MOTOR VEHICLE CLUTCH

FIELD OF THE INVENTION

This invention relates to an actuator, in particular for controlling a motor vehicle clutch, and being of the kind comprising, carried by a casing, a reversible electric motor having a drive spindle, a driving element for actuating an actuating member, and, for the purpose of enabling the driving member to be driven by the motor, a coupling mechanism which is operatively arranged between the said driving member and the said drive spindle, the coupling mechanism comprising a toothed sector plate which is coupled with the said element for rotation with the latter and which is coupled to the motor drive spindle through meshing means, the coupling mechanism further including an actuating force reducing mechanism which includes at least one resilient compensating means for reducing the driving effort required of the electric motor. Such an actuator will be referred to as an actuator of the kind specified.

BACKGROUND OF THE INVENTION

An actuator of the kind specified is described in one form in the specification of French published patent application No. FR 2 610 261A, in which the actuating force reducing means is in the form of a helical spring and a toothed wheel or pinion, which meshes with the toothed sector member. Such an arrangement involves an increase in the length of the toothed sector plate, in order to allow this toothed wheel or pinion to come into engagement with it. In addition, the toothed wheel and the toothed sector plate have to be suitably treated, so as to be able to withstand the substantial forces exerted in this part of the actuator. This gives rise to manufacturing difficulties, and also involves the risk of deformation and the possibility of cracking of the components.

DISCUSSION OF THE INVENTION

An object of the present invention is to overcome these drawbacks, by providing a novel actuator in which the modification necessary to the toothed sector plate is minimized, but in which at the same time its reliability and endurance are improved In accordance with the invention, an actuator of the kind specified is characterised in that it comprises a compensating lever which is articulated on the toothed sector plate and on an intermediate pivoting lever, which is itself articulated on the casing and operatively coupled to the said resilient compensating means.

In the actuator according to the invention, the length of the toothed sector plate is able to be reduced because it is now coupled (at a point behind its teeth) with a compensating lever. In addition, the forces exerted on the teeth of the sector plate are reduced. It will be appreciated that the overall thickness of the actuator itself, and its axial length, are not increased.

Preferably, the compensating lever is in two parts, which are arranged on either side of the toothed sector plate, and the intermediate pivoting lever is articulated on a bent compensating arm, which is itself coupled to the resilient compensating means. In this way the number of standard components is maximized, and the number of special components required is accordingly minimized.

In addition, it is merely necessary to provide an aperture in the toothed sector plate so that the compensating lever can be fitted in it. This aperture is in a part of the sector plate having sufficient supporting material. The actual position of the aperture in the toothed sector plate depends on the length of the compensating lever.

Preferably, the various articulations or pivots include bearings in order to reduce friction.

Preferred embodiments of the invention will now be described, by way of example only and with reference to the accompanying drawings.

DESCRIPTION OF PREFERRED EMBODIMENTS OF THE INVENTION

Figure 9:
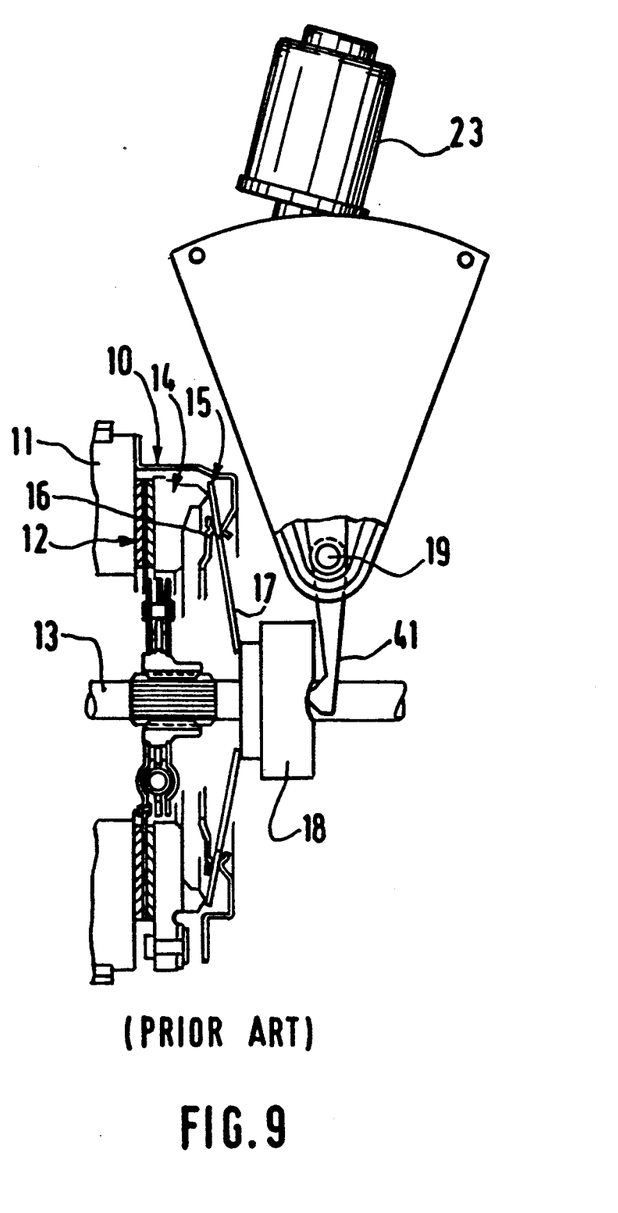
FIG. 9 is a general diagrammatic view of a clutch and its actuator, incorporating a new take-up assembly.

The actuator shown in the drawings is adapted to control a coupling means (FIG. 9), for example a friction clutch for a motor vehicle. The clutch is actuated by a clutch release bearing which is itself operated by an actuating member, which may for example be in the form of a fork. This fork (FIG. 9) is fixed to a spindle 19 which constitutes a driving or output element of the actuator.

It should be mentioned here that it is of course possible to incorporate the actuator in an hydraulic servo system having an hydraulic coupling between the actuator and the clutch release bearing, by interposing an emitting or output cylinder and a receiving or input cylinder, coupled hydraulically with the output cylinder. The driving element is then arranged to act on the piston of the emitting cylinder and is in the form of a disc which is fixed to the spindle 19 and connected to the emitting cylinder piston through a linkage of the crank and connecting rod type. In a further modification, the driving element may consist of a gear wheel which is part of a gear mechanism.

Referring to the drawings, the actuator comprises a relatively flat casing 22 comprising a casing body 22a of cast metal, and a cover plate 22b. An electric motor 23 is carried by the casing 22, being fixed to the outside of the casing. The drive spindle 24 of the motor 23 extends into the casing 22 and terminates in an arrangement comprising a worm in the form of a threaded portion which is in three sections, having respective threads of opposite hands alternating with each other.

The casing 22 also carries, and encloses, a coupling mechanism 31 which is arranged to couple the spindle 24 of the motor 23 to the driving element 19. The latter is directly secured to a toothed sector plate 33. The toothed sector plate 33 is part of the mechanism 31 and is mounted for limited rotation about the axis of the spindle 19 so as to rotate the latter. The mechanism 31 also includes two pinions 34 and 35, each of which is in the form of two toothed wheels disposed coaxially side by side. In each of these pinions 34 and 35, one of the toothed wheels engages with the toothed sector plate 33, while the other toothed wheel meshes with one of the worm sections on the motor drive spindle 24. The pinions 34 and 35 are mounted on two parallel fixed mounting pins, which are arranged on either side of the worm of the drive spindle 24. This arrangement has the advantage of absorbing axial reaction forces exerted on the threaded portion of the drive spindle 24. The mounting pin for the pinion 35 can be seen in FIG. 2 at 29. These mounting pins are for example force fitted into holes 29 formed in the cast casing body 22a.

Figure 3:
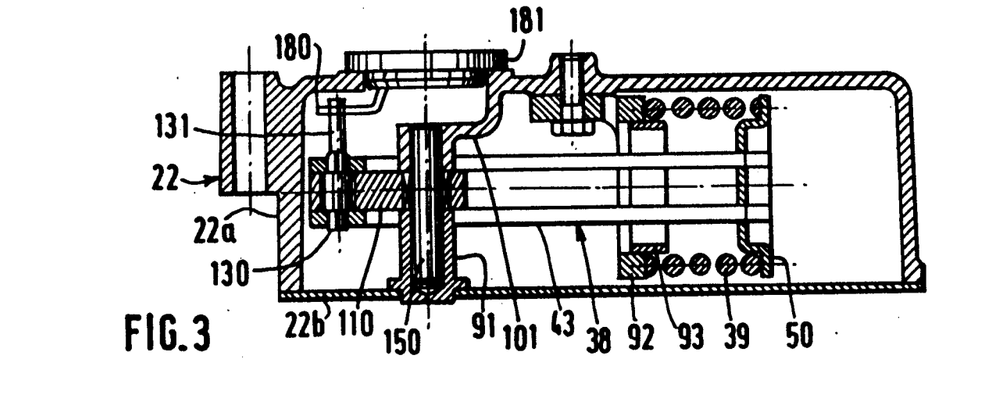
FIG. 3 is a cross section taken on the line 3—3 in FIG. 1, with the cover plate of the casing again being shown.

In addition, in order to reduce the operating force of the electric motor 23, the coupling mechanism 31 includes an actuating force reducing mechanism 38, comprising at least one resilient force reducing means and a bent compensating arm 43. In this example the resilient force reducing means is in the form of a helical spring 39. The compensating arm 43 is coupled with the spring 39 through one of its ends, and consists partly of two parallel elements. The spring 39 is mounted in compression between a fixed thrust seat 92 and a dished washer 50 which is engaged by one end of the compensating arm 43. The fixed thrust seat 92 is L-shaped in elevation, comprising an annular body portion with an anchor lug extending parallel to the axis of the body from the circumference of the latter. This anchor lug is fastened to the casing body 22a by means of a stud, as can be seen in FIG. 3. The annular body portion of the thrust seat 92 has a central hole through which the compensating arm 43 passes. A guide element 93, for internally supporting and guiding the endmost turn of the spring 39 and the compensating arm 43, is mounted coaxially in the annular body portion of the thrust seat 92. The guide element 93 is preferably made of a plastics material, while the two parallel elements of the compensating arm 43 have a T-shaped end portion (see FIG. 1) for fitting within the dished washer 50, with the wing portions of the T-shaped end engaging and cooperating with the reinforcing base portion of the dish of the washer 50. The corresponding end of the spring 39 bears on the washer 50 and is centred by the dished portion of the latter.

The actuator also includes a wear compensating mechanism 65 which acts in cooperation with the toothed sector plate 33. The wear compensating mechanism 65 comprises a flat lever 66 which is pivotally mounted parallel to the sector plate 33 and which extends along the latter, together with a pawl 68. The lever 66 consists of two elements 66a and 66b. The element 66a has a toothed edge which cooperates with a toothed portion of the pawl 68. The element 66a is pivotally mounted on a pivot pin 71 which is fixed to the sector plate 33, from which it projects laterally. The element 66b is secured to the end of the driving spindle 19 so as to operate the latter. The element 66b carries a pin 72 which is engaged with a radial clearance in an oblong hole 174, which extends in a generally circumferential direction, and which is formed in the element 66a. This arrangement enables movement of the element 66a to be greater than that of the element 66a. There is thus a high degree of precision in operation. The pin 72 also projects into an aperture 173 which is formed in the sector plate 33 and which is elongated in the circumferential direction, so as to constitute a double stop member limiting the movement of the mechanism 65.

The element 66a is caused to pivot about the pivot pin 71 by the terminal branch of a spring 77, which is wound around a further pin 78 (FIG. 1) fixed to the sector plate 33. In a similar way, the pawl 68 is pivotally mounted on a further fixed pin 80 carried by the sector plate 33. The pin 80 has a head, and a spring 82 is wound around the pin 80 between the lateral surface of the pawl and the head of the mounting pin 80. A terminal branch of the spring 82 is in contact with the edge of the pawl 68, so as to bias it in a direction such that the toothed portion of the pawl comes into engagement with the toothed edge 69 of the element 66a. In this embodiment, the toothed sector plate 33 and the whole of the lever 66 are rotatable together. The pawl 68 and the element 66a become uncoupled from each other at the end of the travel of the toothed sector plate 33, when the pawl 68 comes into engagement with a stop element 84 fixed to the casing 22. The operation of this wear compensating mechanism is comparable with that which is disclosed in the specification of French published patent application No. FR 2 564 920A, and its corresponding U.S. Pat. No. 4,671,400 and will nor therefore be described here in any greater detail.

Figure 1:
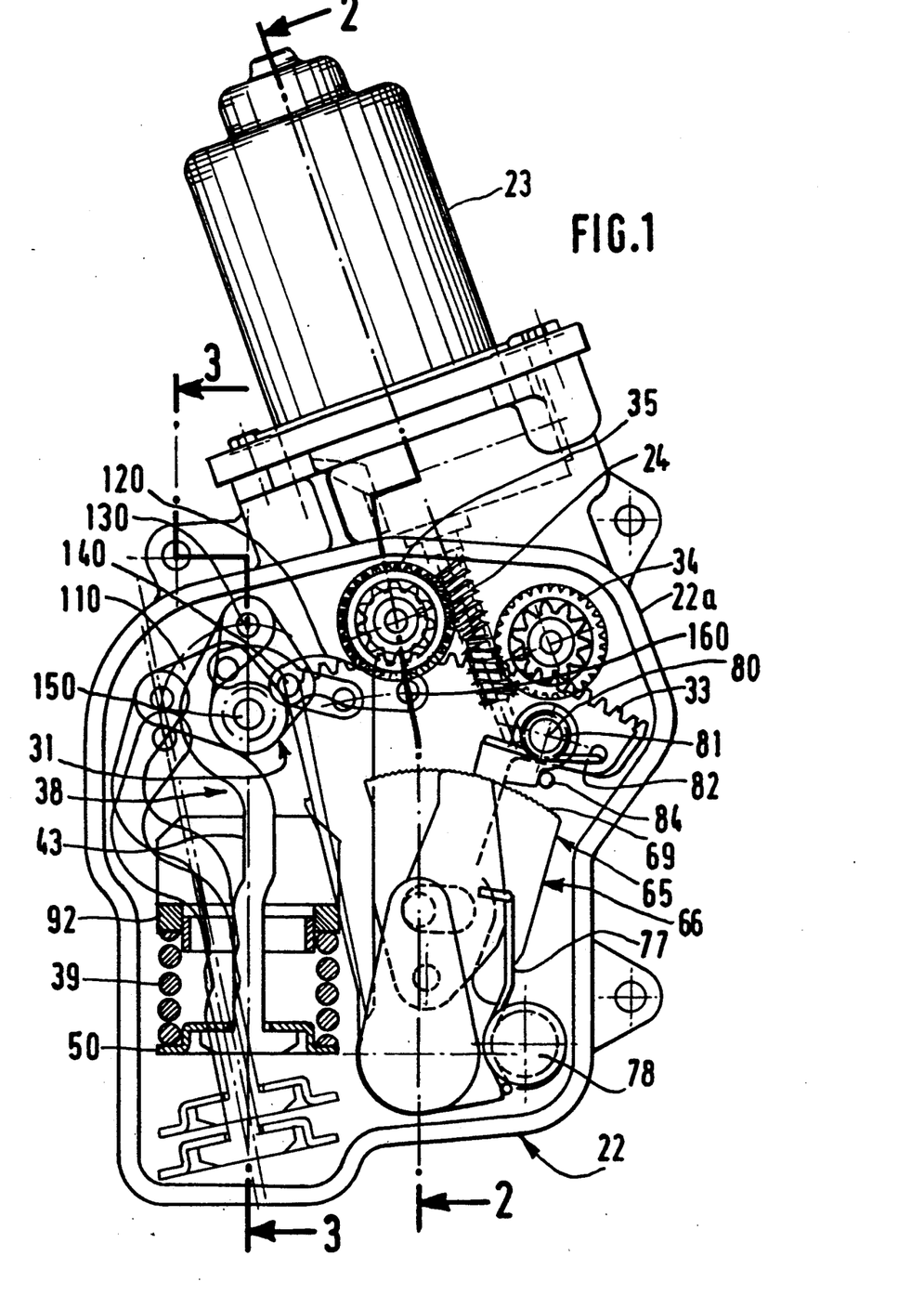
FIG. 1 is a diagrammatic view showing an actuator in accordance with the invention, shown partly in cross section and with the casing open.
Figure 4:
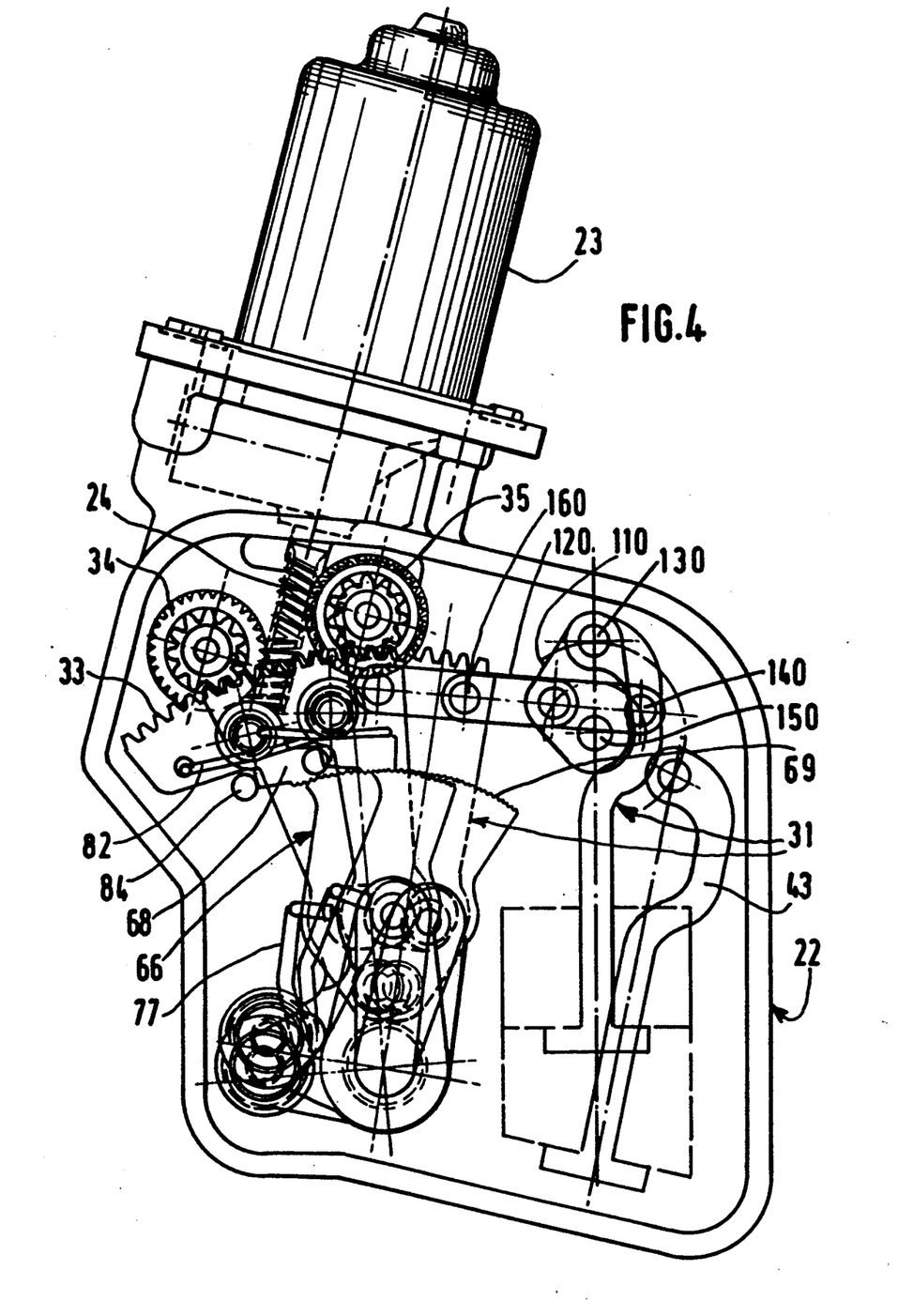
FIG. 4 is a view similar to FIG. 1, but showing a second embodiment of the invention.
Figure 5:
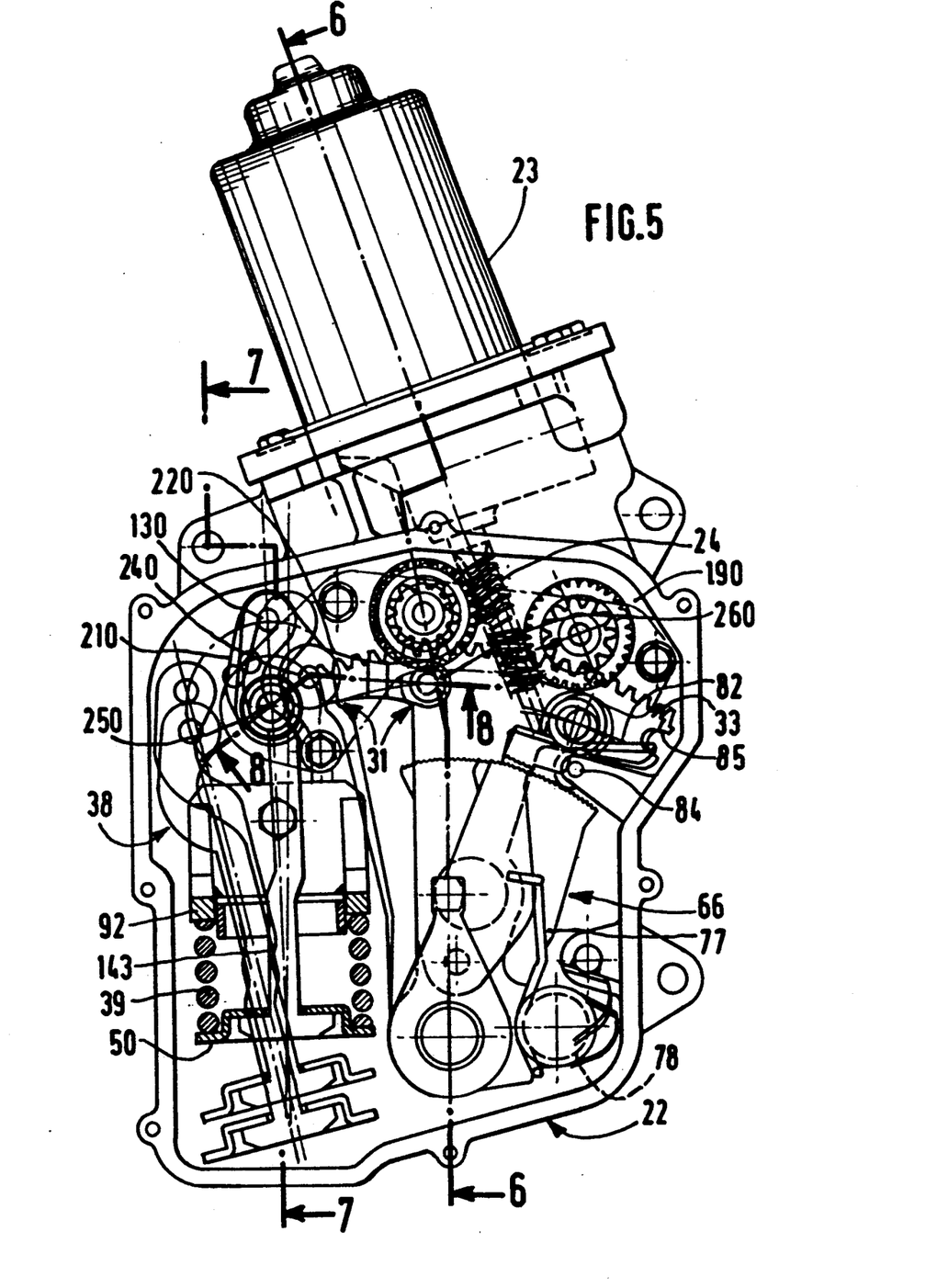
FIG. 5 is a view similar to FIG. 1, but showing a third embodiment of the invention.
Figure 6:
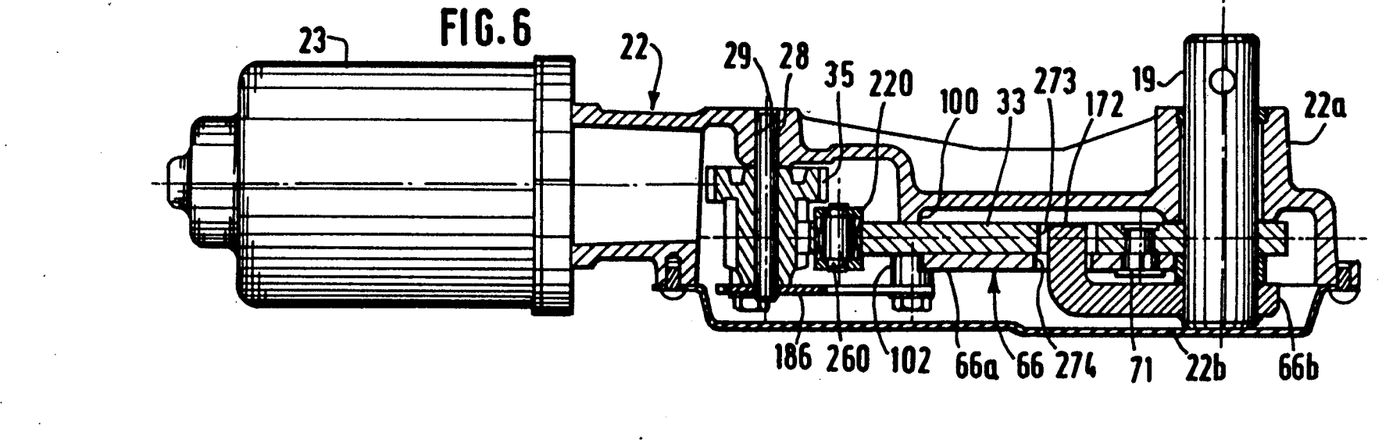
FIG. 6 is a cross sectional view taken on the line 6—6 in FIG. 5.

The actuating force reducing mechanism 38 includes a compensating lever (indicated at 120 in FIGS. 1 and 4, and at 220 in FIG. 5). This compensating lever is articulated on the toothed sector plate 33, and on an intermediate pivoting lever (indicated at 110 in FIGS. 1 and 4 and at 210 in FIG. 5). The intermediate pivoting lever is articulated on the casing 22, being connected to the spring 39 which acts as a resilient compensating means. The articulations preferably include anti-friction bearings, for example in the form of rolling bearings (which are shown diagrammatically by crosses, as for example in FIG. 3 between the intermediate pivoting lever 110 and a mounting pin 150, which will be referred to again below). Alternatively, the articulation may be in the form of dowels of anti-friction material, such as are indicated in FIG. 3, between the intermediate pivoting lever 110 and a spacing member 130, which will also be referred to below.

Figure 2:
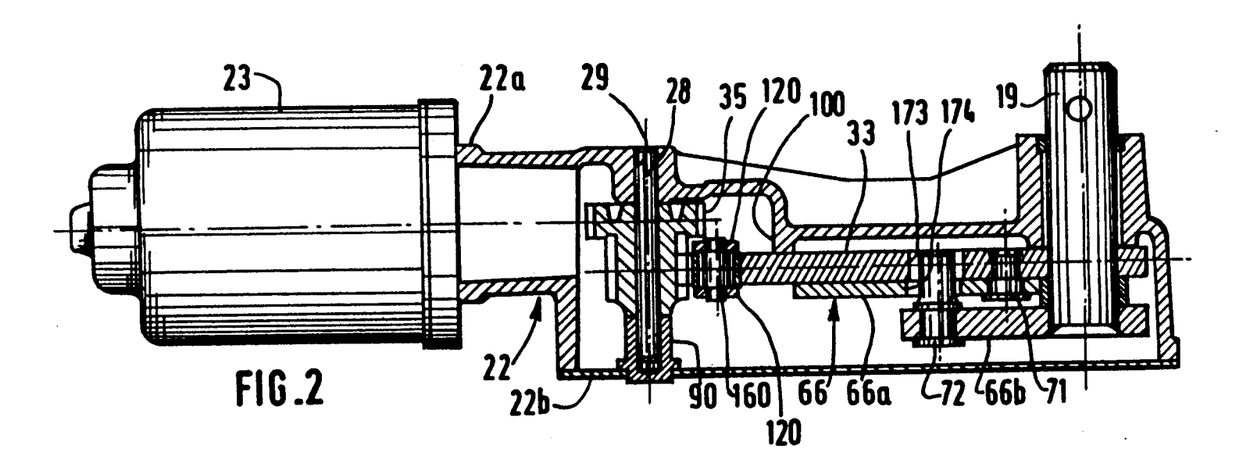
FIG. 2 is a cross section taken on the line 2—2 in FIG. 1, with the casing having its cover plate shown in position.

Referring now to FIGS. 1 to 3, the compensating lever 120 consists of two parallel elements which extend on either side of the toothed sector plate 33. These elements are connected together at one end through a spacer 160, via an anti-friction dowel as shown in FIG. 2. The spacer 160 extends through an aperture formed in the sector plate 33. At their other end, the elements 120 are again joined together, through a further spacer 140, FIG. 1, which passes through the lever 110 via an aperture formed in the latter, with an anti-friction dowel again being interposed.

In the present example, the elements of the intermediate pivoting lever 110 are force-fitted on the end spigots (of reduced diameter) of the spacers 140 and 160, while the anti-friction dowel is encircled by a spacer ring. The intermediate pivoting lever 110 is generally triangular in shape, as can be seen in FIG. 1, and is in monobloc form. It is pivoted on the compensating lever 120 by means of the spacer 140. The lever 110 is interposed between the two elements of the lever 120, and is mounted on the casing 22 by means of the mounting pin 150 mentioned above.

The mounting pin 150, like the mounting pins 28, is force-fitted at one end into the casing 22, being fitted in a hole formed in a mounting web portion 101 (see FIG. 3) which is formed integrally with the casing body 22a and extends at right angles to the base of the body 22a. The mounting pin 150 also extends parallel to the above mentioned spacer 130. The mounting pin 150 passes through the intermediate pivoting lever 120, via a hole formed in the latter, and its other end is located by means of a shouldered sleeve 91, with the pin 150 penetrating into the blind bore of this sleeve. The sleeve 91 extends through the cover plate 22b of the casing, with its shoulder bearing on the inner face of the cover plate that faces towards the base of the casing body 22a. The free ends of the mounting pins 28 for the pinions 34 and 35 are also mounted in shouldered sleeves 90, which are identical with the sleeve 91 and again carried by the cover plate 22b. The sleeves 90 and 91 thus enable the pinions 34 and 35, and the intermediate pivoting lever 110, to be located axially in fixed positions after the cover plate 22b has been fitted on the casing body 22a.

The bent compensating arm 43 is pivoted on the spacing member 130. The elements of the arm 43 extend parallel, and spaced from, each other on either side of the lever 110, being joined together by means of the spacing member 130 which extends through a hole formed in the lever 110, with an anti-friction dowel being interposed between the spacing member 130 and the lever 110. The spacing member 130 has an extension portion 131, FIG. 3, which extends towards the base of the casing body 22a. The extension portion 131 cooperates with a manoeuvring arm 180, which is part of a potentiometer 181 which is fitted in the casing body 22b (see FIG. 3).

In the position in which the clutch is engaged (FIG. 1), the axis of the compensating arm 43 is aligned with the respective centres of the mounting pin 150 and of the spacing member 130, with the spacer 140 being located to the left of the pivot points 130 and 150. The spacer 140 is thus disposed transversely between these pivot points.

In operation, the electric motor 23 drives the toothed sector plate 33, which is displaced to the left as seen in FIG. 1, driving the compensating lever 120 and causing the intermediate pivoting lever 110 to rotate pivotally about the mounting pin 150. The compensating arm 43 thus moves in a swinging motion, as can be seen in the various positions indicated in FIG. 1. The force reducing mechanism 38 then acts in a thrust mode on the coupling mechanism 31.

It will be appreciated that the assembly is very robust, and that frictional effects are minimized, since the lever 110 acts in a pivoting sense on the toothed sector plate 33. The latter is of standard form and the only modification needed is to provide it with an aperture through which the spacer 160 can extend. This spacer 160 is, in this example, arranged generally level with the pinion 35, and the compensating lever 120 is of bent form. The spacer 160 is thus mounted at one of the circumferential ends of the lever 33, close to the teeth of the latter and in a region where there is a sufficient amount of material.

The force reducing mechanism 38 may of course be arranged to act in traction, instead of in a thrust mode. It acts in traction in the arrangement shown in FIG. 4, in which the mechanism 38 is arranged to the right of the coupling mechanism 31 and not to its left as in FIG. 1. The compensating lever 120 is simplified. In each case, the compensating arm 43 and the intermediate pivoting lever 110 lie to one side of the toothed sector plate 33, and are connected to the appropriate circumferential end of the toothed sector plate through the compensating lever 120 in the vicinity of the teeth of the sector plate.

The present invention is of course not limited to the embodiments described above. A further embodiment is for example shown in FIGS. 5 to 8.

Figure 7:
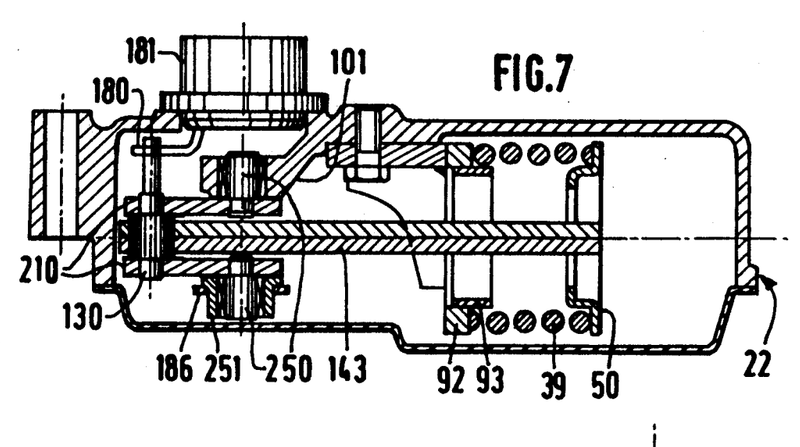
FIG. 7 is a cross sectional view taken on the line 7—7 in FIG. 5.

Referring therefore to FIGS. 5 to 8, the intermediate pivoting lever 210 here consists of two elements which are arranged on either side of the bent compensating arm, here indicated by the reference numeral 143 and having two parallel elements which are arranged in overlying contact with each other as can be seen in FIG. 7. These elements, extending side by side with the sector plate 33, are joined together through the spacer 130, being force-fitted on the terminal tail portions of the latter as in FIG. 3. In the present case, a bearing is interposed radially between the double arm 143 and the spacer 130. Each intermediate pivoting lever 210 has a cylindrical pivot pin 250 fastened to it by riveting, for mounting on the casing 22. One of the pins 250 is engaged in a hole formed in the web portion 101 of the casing body 22a, with a rolling bearing interposed, while the other element 210 is mounted on a shouldered sleeve 251 by means of its pivot pin 250 which extends through the internal bore of this sleeve, with a bearing again being interposed.

Figure 8:
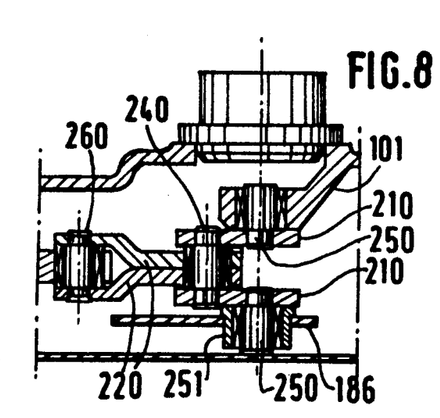
FIG. 8 is a scrap cross section taken on the line 3—3 in FIG. 5.

The compensating lever 220 is also in two parts, which are mounted on either side of the sector plate 33 and which are joined together by means of spacers 260, having rolled over heads and extending through a hole formed in the sector plate 33 as in FIG. 3. These two parts of the compensating lever 223 are brought together beyond the sector plate 33, and are inserted axially between the elements of the compensating lever 210, as is best seen in FIG. 8. The compensating lever 220 is pivoted on the elements of the pivoting lever 210 by means of a spacer 240 similar to the spacer 260, with a bearing being interposed. A bearing is also interposed between the spacer 260 and the corresponding hole formed in the sector plate 33.

In the arrangement shown in FIGS. 5 to 8, the pinions 34 and 35 and the intermediate pivoting lever 210 are located axially by means of a retaining plate 186 which overlies the teeth of the sector plate 33 and the pinions 34 and 35, so as to overhang them. The shape of this plate can be seen in FIG. 5. It is fastened to the casing body 22a by means of three threaded studs, with spacing bushes 102 interposed (see FIG. 6). In this embodiment, the lever 66b has an axial locating flange 172 engaging in a circular hole 274 formed in the lever 66a, and a circular hole 273 formed in the sector plate 33. The member 66b is, as in FIGS. 1 to 4, welded to the driving element 19, with a spacer between the sector plate 33 and the member 66b (see FIGS. 2 and 6). The toothed sector plate 33 is thus coupled in rotation to the driving element, i.e. the spindle 19, through the elements 66a and 66b.

It will be noted that the spindle 19 has a hole to accommodate a cotter pin for fitting a declutching fork on to the spindle. The spindle 19 may of course be fixed to a driving wheel or disc which is arranged to drive a piston of an emitting or output cylinder of an hydraulic servo system of the kind already mentioned, through a linkage of the crank and connecting rod type as has also been mentioned above.

In all cases it will be appreciated that the toothed sector plate 33 is of reduced length, and that the fitting of the force reducing mechanism requires only that the sector plate or lever 33 be suitably apertured. The stiffness of the spring 39 depends of course on the application to which the actuating mechanism is to be put. In particular, (FIG. 9) where the actuator is intended for control of a vehicle, it depends on the load exerted by the diaphragm 15 that normally forms part of an associated clutch. In the usual way, the diaphragm 15 bears at 16 on a cover member 10 of the clutch, to urge a pressure plate 14 towards a reaction plate 11 so as to grip a friction disc 12 between them, the friction disc 12 being fixed to the input shaft 13 of the gearbox, between the pressure plate 14 and the reaction plate 11 which are themselves fixed to the engine crankshaft for rotation with the latter. The clutch release bearing 18 which is operated by the actuator (see U.S. Pat. No. 4,671,400, column 3, lines 37–57) described here acts on the ends of the fingers 17 of the clutch diaphragm 15.

In a known manner, the spring 39 exerts no force on the sector plate 33 when the clutch is engaged (i.e. when the friction disc of the clutch is gripped and the pivot points 130, 150 are aligned with the axis of the lever 43 as in FIG. 1). By contrast, during the declutching operation or during re-engagement of the clutch, the spring 39 compensates for the load applied by the diaphragm on the sector plate 33 (having regard to the different lever arms involved), in such a way that the reversible electric motor 23, like the coupling mechanism 31, is only required to exert small forces.

The electric motor 23 may be provided with a drive spindle having a worm which has only one threaded portion, driving a pinion having two toothed wheels that respectively engage with the threaded portion of the drive spindle 24 and the toothed sector plate 33, it being understood that in all cases the toothed sector plate 33 is coupled with the drive spindle 24 through a suitable meshing mechanism.

The mounting pins 28 and 150 may be, for example, welded to the casing body 22a.

What is claimed is:

1. An actuator for a motor vehicle clutch, comprising: a casing; a reversible electric motor carried by the casing and including a drive spindle; a driving element carried by the casing for operating an external clutch actuating member; and a coupling mechanism carried by the casing and coupling said driving element and the said drive spindle of the motor together, the coupling mechanism comprising: a toothed sector member; means coupling the toothed sector member to said driving element for rotation of the latter therewith; meshing means coupling said drive spindle of the motor with the toothed sector member; and actuating force reducing means, the actuating force reducing means comprising at least one resilient compensating means for reducing the actuating force required of the electric motor, an intermediate pivoting lever articulated on the casing and operatively coupled to the resilient compensating means, and a compensating lever articulated on the toothed sector member and on said intermediate pivoting lever.

2. An actuator according to claim 1, wherein said compensating lever comprises two parts defining a first portion extending on one side of the tooth sector member and a second portion extending on the other side of the toothed sector member, said parts are connected together at one end through a spacer which extends through an aperture formed in said toothed sector member.

3. An actuator according to claim 1, further including a bent compensating arm, the resilient compensating means being coupled to said bent compensating arm and the latter being articulated to the intermediate pivoting lever.

4. An actuator according to claim 3, wherein the bent compensating arm and the intermediate pivoting lever lie to one side of the toothed sector member and are connected to the appropriate circumferential end of the toothed sector member through the compensating lever in the vicinity of the teeth of said toothed sector member.

5. An actuator according to claim 3, wherein the intermediate pivoting lever comprises a first element extending on one side of the bent compensating arm and a second element in overlying contact with the first element and extending on the other side of the bent compensating arm.

6. An actuator according to claim 5, wherein the casing includes a casing body defining an internal mounting web having a hole formed therein, said first element of the intermediate pivoting lever having a first cylindrical pivot pin riveted thereto and engaged in said hole in the mounting web, its said second element having a second cylindrical pivot pin riveted thereto and arranged in line with the first pivot pin, the actuator further including a sleeve defining a shoulder, a retaining plate, and means securing the retaining plate to the casing, said shouldered sleeve being mounted between the retaining plate and said second element of the intermediate pivoting lever, and said second pivot pin being mounted in the shouldered sleeve whereby the intermediate pivot lever is pivotally mounted partly in the mounting web of the casing and partly in said shouldered sleeve in a fixed position in the casing.

7. An actuator according to claim 3, wherein the intermediate pivoting lever is monobloc, the bent compensating arm comprising a first element extending on one side of said intermediate lever and a second element extending on the other side of said intermediate 8. An actuator according to claim 7, further including a spacing member carried by the bent compensating arm and carrying the intermediate pivoting lever whereby the latter is pivoted to the compensating arm.

9. An actuator according to claim 7, wherein the casing includes a casing body defining an internal mounting web having a hole formed therein, and a mounting pin force-fitted in said hole, the intermediate pivoting lever being mounted pivotally on said mounting pin whereby to be articulated on the casing.

10. In actuator according to claim 9, wherein the casing further includes a cover plate, the actuator further comprising a sleeve mounted in the cover plate and defining a shoulder, with said mounting pin being fitted within said shouldered sleeve whereby the intermediate pivoting lever is positioned adjacent the sleeve.

* * * * *